United States Patent
Cho et al.

(10) Patent No.: US 8,918,204 B2
(45) Date of Patent: Dec. 23, 2014

(54) TRANSPORT UNIT

(75) Inventors: Yong-Hak Cho, Emersacker (DE); Thomas Holecek, Nördlingen (DE); Matthias Gastl, Augsburg (DE); Sebastian Mocker, Augsburg (DE); Thomas Henneke, Peiting (DE)

(73) Assignee: Kuka Systems GmbH, Augsburg (DE)

( * ) Notice: Subject to any disclaimer, the term of this patent is extended or adjusted under 35 U.S.C. 154(b) by 236 days.

(21) Appl. No.: 13/512,996

(22) PCT Filed: Nov. 30, 2010

(86) PCT No.: PCT/EP2010/068555
§ 371 (c)(1),
(2), (4) Date: May 31, 2012

(87) PCT Pub. No.: WO2011/067260
PCT Pub. Date: Jun. 9, 2011

(65) Prior Publication Data
US 2012/0239184 A1    Sep. 20, 2012

(30) Foreign Application Priority Data
Dec. 1, 2009   (DE) ..................... 20 2009 015 682 U

(51) Int. Cl.
G06F 7/00    (2006.01)
B25J 9/04    (2006.01)
B21D 43/10   (2006.01)
B25J 18/02   (2006.01)
B21D 43/05   (2006.01)

(52) U.S. Cl.
CPC .............. B25J 9/047 (2013.01); B21D 43/105 (2013.01); B25J 18/02 (2013.01); B21D 43/05 (2013.01)

USPC .......... 700/228; 700/56; 414/685; 414/751.1; 414/225.01

(58) Field of Classification Search
USPC ........................................... 700/228
See application file for complete search history.

(56) References Cited

U.S. PATENT DOCUMENTS

| 5,392,630 A | 2/1995 | Marinoni et al. |
| 5,993,144 A | 11/1999 | Inoue |
| 6,192,285 B1 * | 2/2001 | Takayama ........................ 700/56 |
| 2002/0029701 A1 * | 3/2002 | Harsch et al. ................. 100/139 |
| 2002/0192058 A1 * | 12/2002 | Harsch et al. ............. 414/225.01 |
| 2006/0260381 A1 * | 11/2006 | Reichenbach .............. 72/405.11 |
| 2007/0140823 A1 * | 6/2007 | Dorner et al. ................. 414/685 |
| 2007/0172344 A1 * | 7/2007 | Reichenbach ............. 414/751.1 |

FOREIGN PATENT DOCUMENTS

| DE | 196 08 844 A1 | 9/1997 |
| DE | 202 16 013 U1 | 12/2003 |
| DE | 20 2007 010097 U1 | 11/2007 |
| EP | 0 502 233 A1 | 9/1992 |
| EP | 1 623 773 A1 | 2/2006 |

(Continued)

*Primary Examiner* — Gene Crawford
*Assistant Examiner* — Kyle Logan
(74) *Attorney, Agent, or Firm* — McGlew and Tuttle, P.C.

(57) ABSTRACT

A transport unit (1) is provided for workpieces (2), in particular sheet metal parts, between neighboring placement areas or machining devices (3, 4), in particular presses. The transport unit (1) includes a multi-axis robot (5) having a gripper tool (9). A controllable transfer unit (6) is also provided that is guided by the robot (5). The unit includes an advancement unit (7) and a pivot unit (8) for the gripper tool (9).

22 Claims, 12 Drawing Sheets

(56) References Cited

FOREIGN PATENT DOCUMENTS

| | | | |
|---|---|---|---|
| GB | 2 174 065 A | 10/1986 | |
| GB | 2 312 414 A | 10/1997 | |
| JP | 8141969 A | 6/1996 | |
| JP | 2006130518 A | 5/2006 | |
| JP | 2006263895 A | 10/2006 | |
| WO | 01/03891 A1 | 1/2001 | |

* cited by examiner

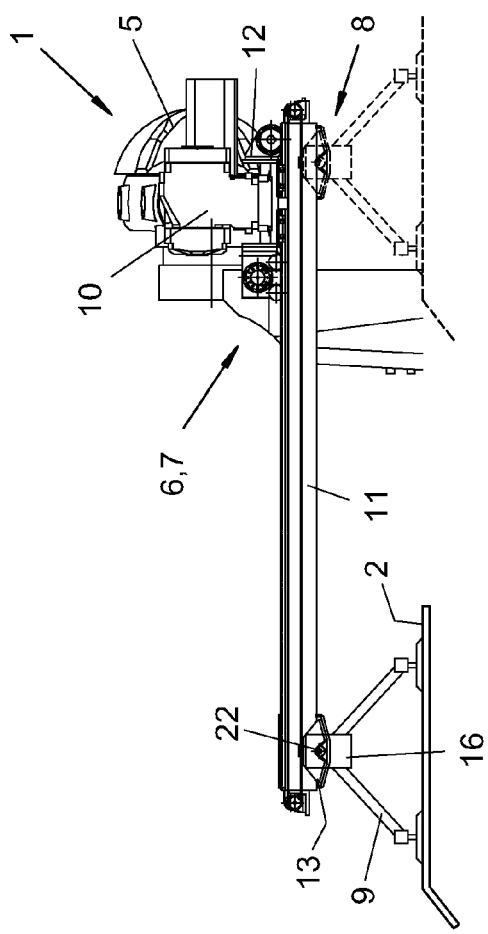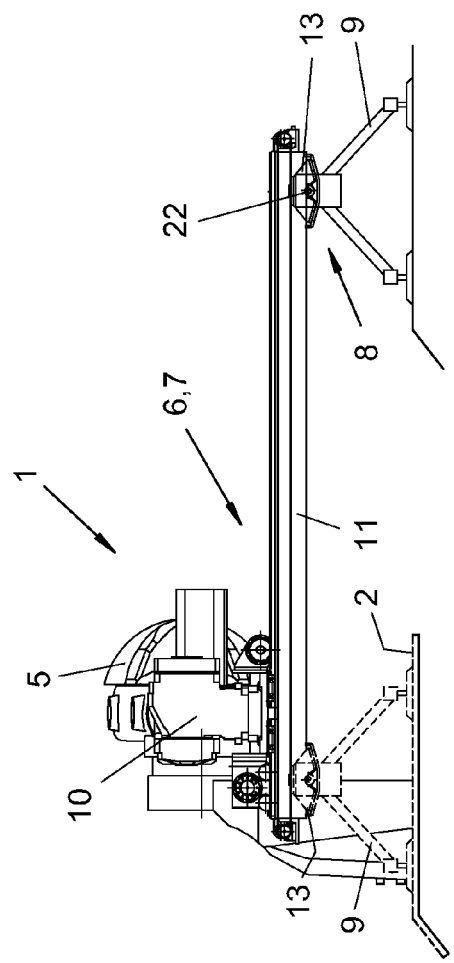

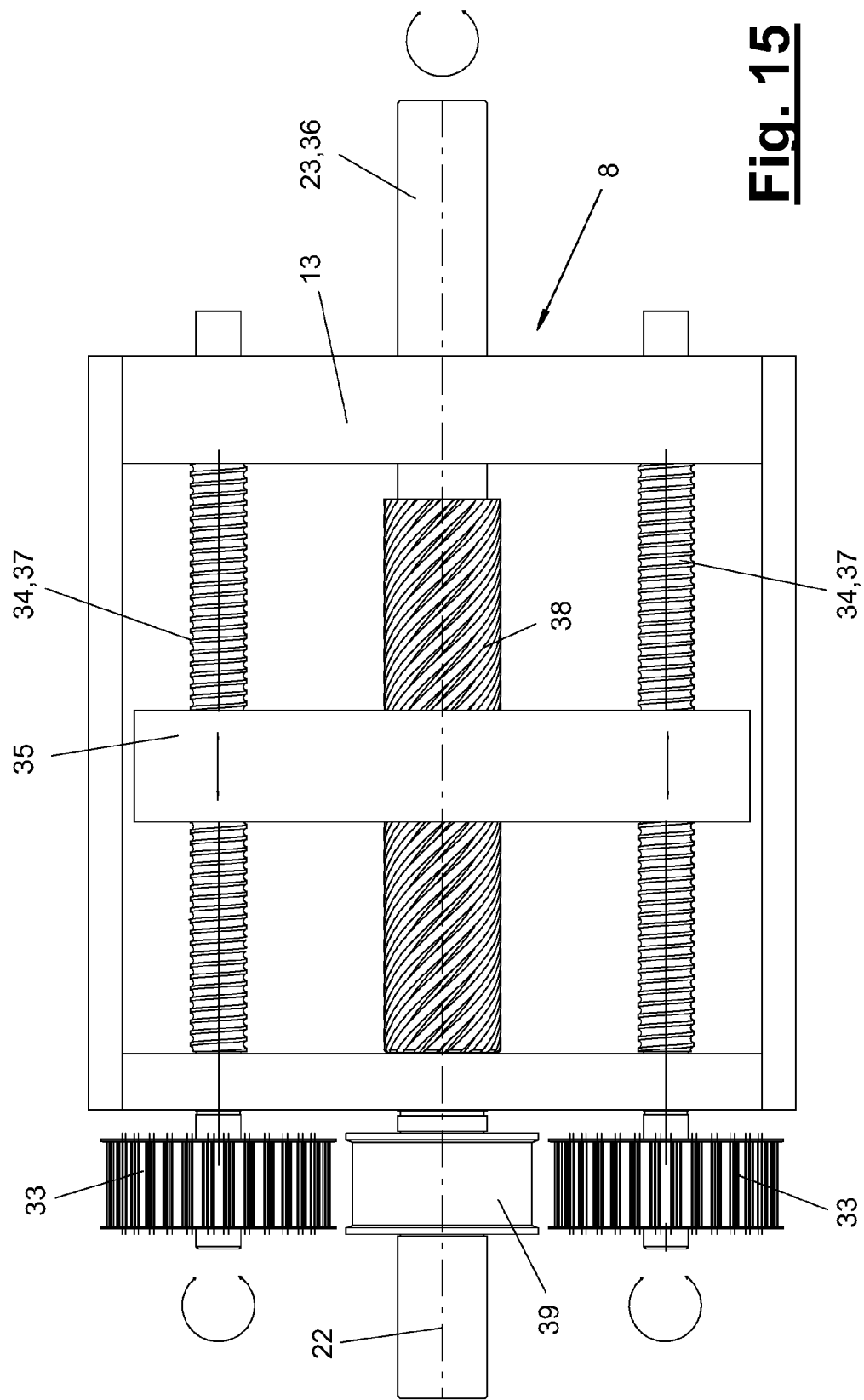

TRANSPORT UNIT

CROSS REFERENCE TO RELATED APPLICATIONS

This application is a United States National Phase application of International Application PCT/EP2010/068555 and claims the benefit of priority under 35 U.S.C. §119 of German Utility Model DE 20 2009 015 682.6 filed Dec. 1, 2009, the entire contents of which are incorporated herein by reference.

FIELD OF THE INVENTION

The present invention pertains to a transport unit for workpieces, especially sheet-metal parts, between adjacent deposit sites or machining devices, especially presses, wherein the transport unit has a multiaxle robot with a gripping tool.

BACKGROUND OF THE INVENTION

Such a transport unit for sheet-metal parts is known from DE 202 16 013 U1. It is designed as a press transfer system, with which sheet-metal parts are transported between adjacent sheet-metal presses of a press working line. The transport unit has a multiaxle robot with a gripping tool. The gripping tool is arranged at the end at an extension arm flanged nonrotatably to the robot hand can be rotated via a connecting rod about a vertical axis at the end of the extension arm as needed. The robot can grip into the presses with the pivotable extension arm and pick up or discharge sheet-metal parts there, wherein the robot hand can remain outside of the press. When the workpiece is transported between the presses, the workpiece can be rotated at the end of the extension arm. The robot performs lifting movements and horizontal pivoting movements during the transport of the workpiece and transports the workpiece to a curved track.

Other press transfer systems, which have a transfer means arranged above the workpiece transport plane in the free space between adjacent presses, are known from practice. This consists of a feed cart, which is movable linearly and transversely to the press working line, with a lifting column, at the end of which is arranged a three-part telescopic carriage, which can be extended linearly on both sides, which has at the latter telescopic carriage a movable transport cart with a pivot means for a tool holder of a gripping tool. The telescopic carriage can be raised and lowered with the lifting cable at the feed cart. The kinematics of this press transfer system is limited and brings about the complicated telescopic carriage arrangement. It is necessary, on the one hand, for achieving a great extension length for meshing with the presses on both sides and, on the other hand, for forming a small telescopic carriage width in the brought-together central position for problem-free placing in the free space between the presses.

SUMMARY OF THE INVENTION

Therefore, an object of the present invention is to provide an improved transport technique for workpieces.

The transport technique according to the invention has the advantage of high movability and flexibility. The transport unit may have, e.g., eight or more axes, which may be separately controllable. Consequently, it is possible to achieve a highly flexible kinematics and an adaptation to different machining devices and their set up conditions, especially at presses in a press working line. The transport unit can be used for the widest variety of machining devices. It may be adapted in a simple manner to varying distances between adjacent machining devices as well. A reprogramming of the robot is sufficient for this in most cases.

The highly flexible transport unit can raise and lower the workpieces and can also transport them to any and especially a largely straight track between the machining devices. This fast and efficient kinematics is favorable for achieving a high transport speed and a correspondingly fast machining cycle, especially press cycle. The transport unit may otherwise also reorient (possibly transport to a curved track) the workpieces as needed.

Furthermore, the transport unit according to the invention has advantages regarding the structural size. The transfer means may have a low overall height, which is, above all, favorable at the end areas, which mesh with the machining device, especially with a press. The necessary opening width of the machining device may be kept small for this meshing, which may likewise contribute to an acceleration of the machine function and the working cycle.

The workpiece can be rotated and pivoted in various ways due to the multiple rotary movability via robot axes and the pivot means. This is favorable in order to be able to handle even workpieces with complicated shapes with protruding workpiece areas quickly and safely. Such workpieces can be, in particular, pivoted via edges within the press by removing and inserting into a sheet-metal press and as a result of this be moved with markedly reduced opening width requirement.

The feed means or gripping tool feed and the pivot means or gripping tool pivot may be included as additional axes in a robot control system and be controlled directly. This is favorable for a fast and accurate movement of the gripping tool and of the held workpiece.

Moreover, the transport unit offers a high positioning accuracy about a plurality of different axes. As a result, the workpiece can be held and locked in the predetermined position during the transport and during the handling operations when removing from and inserting into a machining device. In the pivot means, a transfer may be helpful to reinforce and be able to maintain the reaction torques of the workpiece better, whereby the pivot drive can be relieved.

The pivot axis for the movement of the workpiece can be placed, as needed, at the desired point in the area of the transfer means or even at a distance herefrom in the area of the workpiece. A pivot axis position at the transfer means and at an associated carriage is favorable for a reduction in the overall height. The pivoting movability, which is limited because of the vicinity of the support bar under the circumstances, can be compensated by the rotatory axes of the robot.

All in all, the transport unit according to the invention offers a high efficiency and cost effectiveness in connection with an optimized kinematics. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 11 is a lateral view showing one of various movement positions of the transfer device;

FIG. 12 is a lateral view showing another of various movement positions of the transfer device;

FIG. 15 is a top view of the gear of the pivot drive of FIG. 13.

DESCRIPTION OF THE PREFERRED EMBODIMENTS

Figure 1:
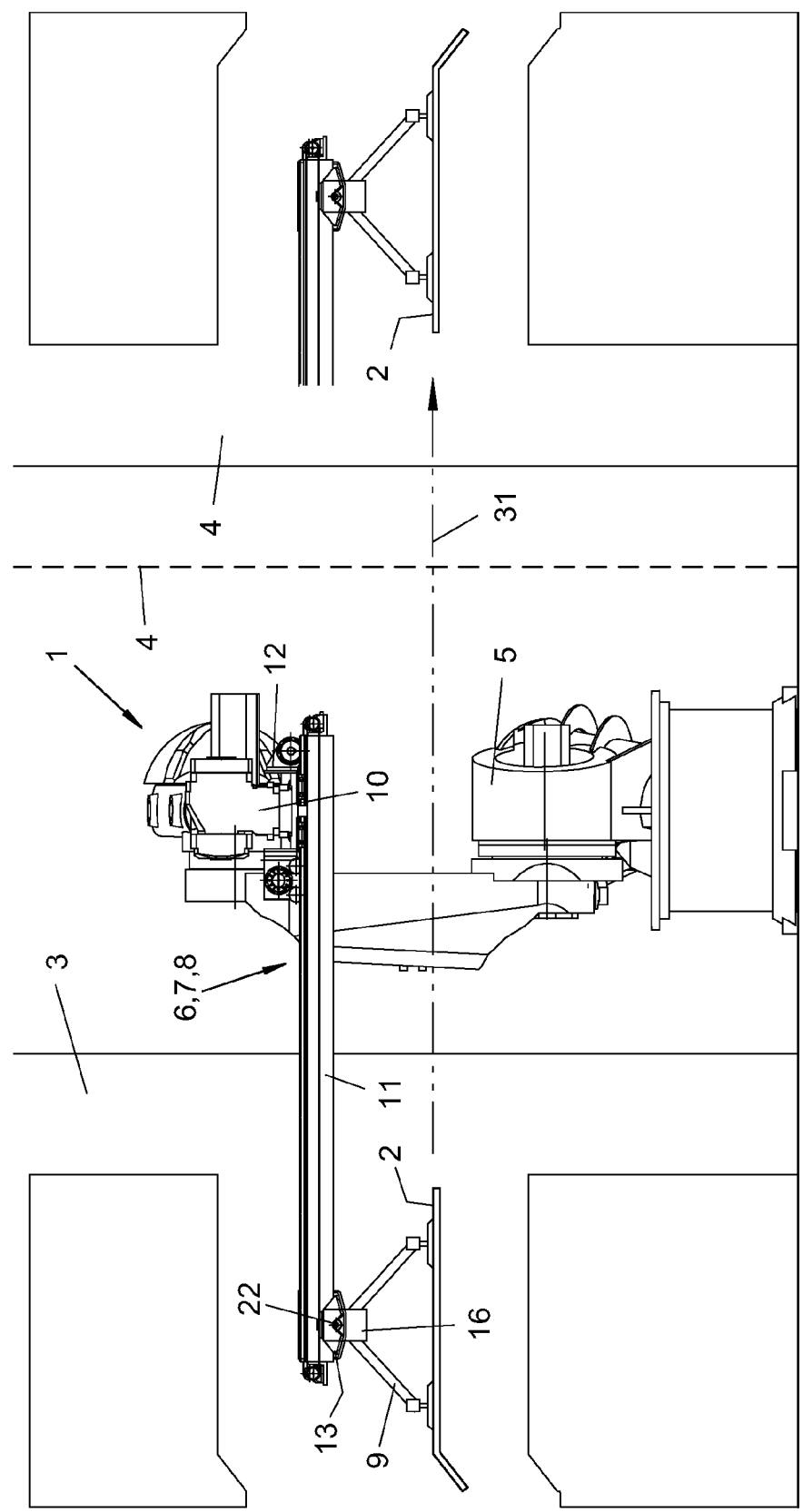
FIG. 1 is a schematic view of a transport unit for sheet-metal parts in the free space between two adjacent presses.

Referring to the drawings in particular, the present invention pertains to a transport unit (1) for workpieces (2) and their transport to one or more adjacent machining devices (3, 4). In particular, the transport unit (1) pertains to a press transfer system for sheet-metal parts (2) between adjacent presses (3, 4), which may possibly be part of a press working line. Moreover, the present invention pertains to a transport process.

FIG. 1 schematically shows a transport unit (1), which is arranged in the free space between two adjacent machining devices (3, 4), here in the form of sheet-metal presses, and the workpieces (2), here, e.g., bent sheet-metal parts, are transported along an essentially straight connecting line (31) between the presses (3, 4). In variation of the embodiment shown, the machining devices (3, 4) may also be of a different nature and type of construction as well as of a different arrangement. In the embodiment shown, the workpieces (2) are transported in a direct path and without intermediate position from the one machining device (3) to the other machining device (4).

In variation of the embodiment shown, a transport device (1) may be arranged between a machining device and a storage area or store room or the like of a different deposit site for workpieces (2) as well, whereby it supplies or takes away the workpieces (2).

For the transport of workpieces, a transport unit (1) is provided, which has at least one multiaxle robot (5) with a transfer device or transfer means (6) and a gripping tool (9). The robot (5) guides the controllable transfer means (6), which has a feed means (7) and a pivot means (8) for the gripping tool (9).

Multiaxle robot (5) may be designed in any suitable manner and may have three or more rotatory and/or translatory axes in any combination of axes and number of axes. In the shown and preferred exemplary embodiment, the robot (5) is designed as an articulated arm robot, which has, e.g., six rotatory basic axes. Moreover, he may have one or more other movement axes, especially a linear travel axes or a pivot axes on a rocker arm or the like.

In addition, the robot (5) has a multiaxle robot hand (10). This multiaxle robot hand (10) may have two or three hand axes, which are part of the above-mentioned basic axes of the robot (5). The, e.g., two or three hand axes may be orthogonal pivot axes and may possibly have a common point of intersection. The robot hand (10) may have, at the output end, a movable output element, e.g., a rotary flange (not shown), which can be firmly or detachably connected to the transfer means (6) in a direct path. A remote controllable change coupling may, moreover, be inserted herein, which makes possible an automatic change of the transfer means (6). For this, the robot (5) may perform, e.g., an overhead movement, which is directed backwards, to a change point or store room for transfer means (6). As an alternative, the transfer means (6) may remain at the robot (5), whereby the gripping tool (9) can be changed on the robot back side in cooperation with a tool store room. In addition, the robot (5) has a robot control system (not shown).

The feed means (7) and pivot means (8) of the transfer means (6) are connected to the robot control system. They may designed as additional axes of the robot (5) and be controlled directly by the robot control system. In the configuration shown, the transport unit (1) may have eight or more movement axes, which can be controlled individually and independently of one another.

The transfer means (6) may have an extension arm function and be used to insert the gripping tool (9) into the opened presses (3, 4) and into the area between the upper and lower tools of the presses (3, 4) schematically shown in FIG. 1. The robot hand (10) and the other robot parts may remain outside the presses (3, 4). The extension arm length of the transfer means (6) may be suited to this meshing function and be optimized correspondingly in length. The transfer means (6) may also be longer, if necessary.

Figure 2:
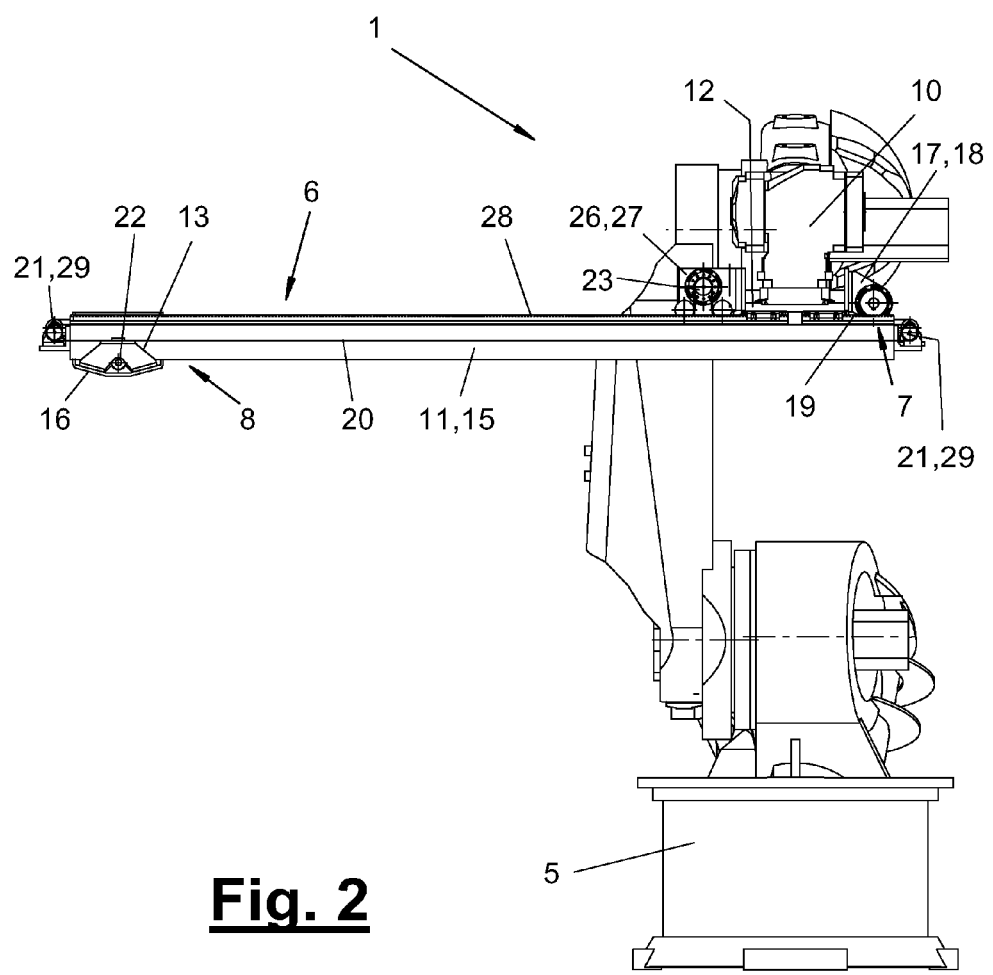
FIG. 2 is a lateral view showing a first variant of a transport unit.
Figure 3:
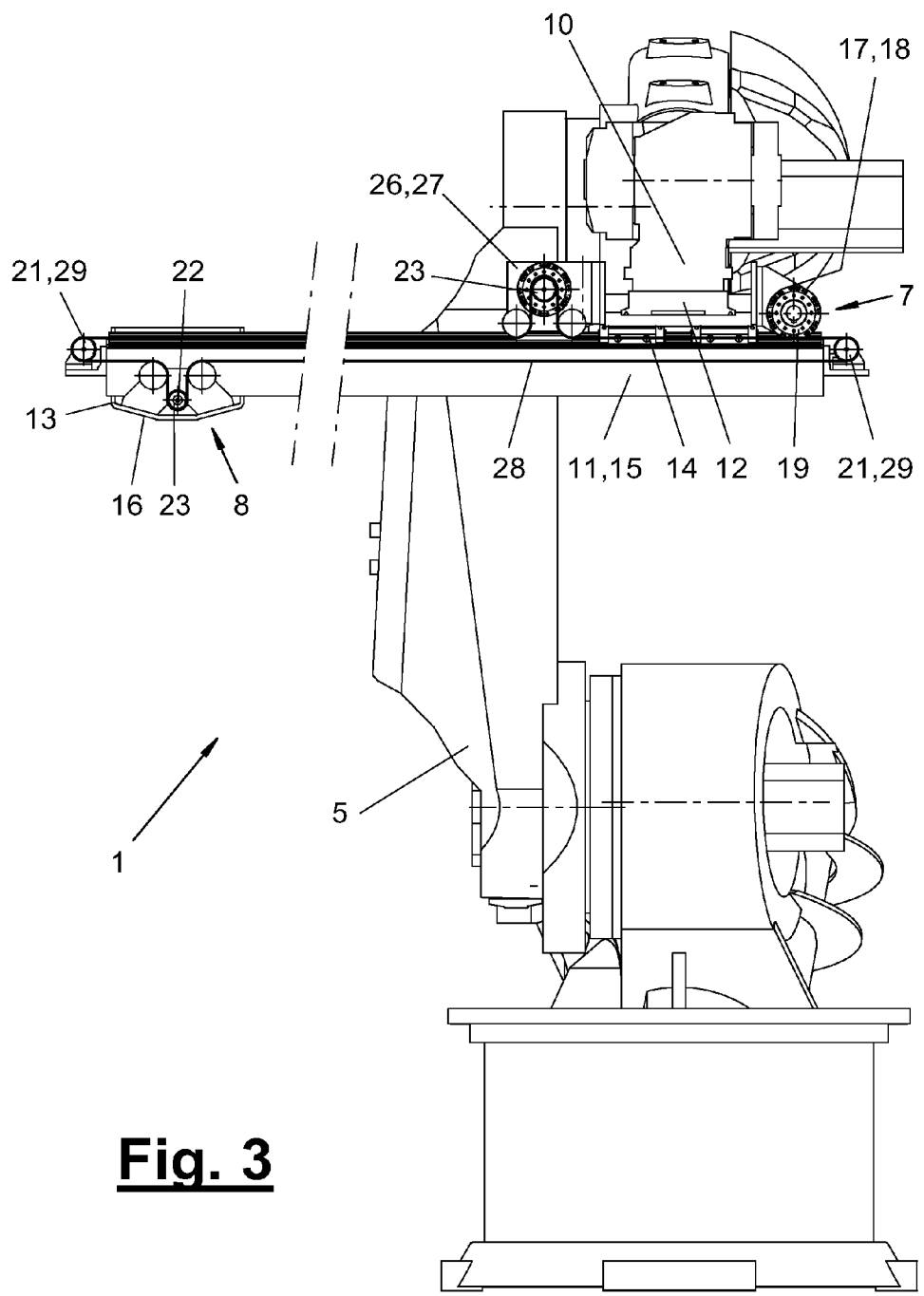
FIG. 3 is a lateral view showing a second variant of the transport unit.
Figure 4:
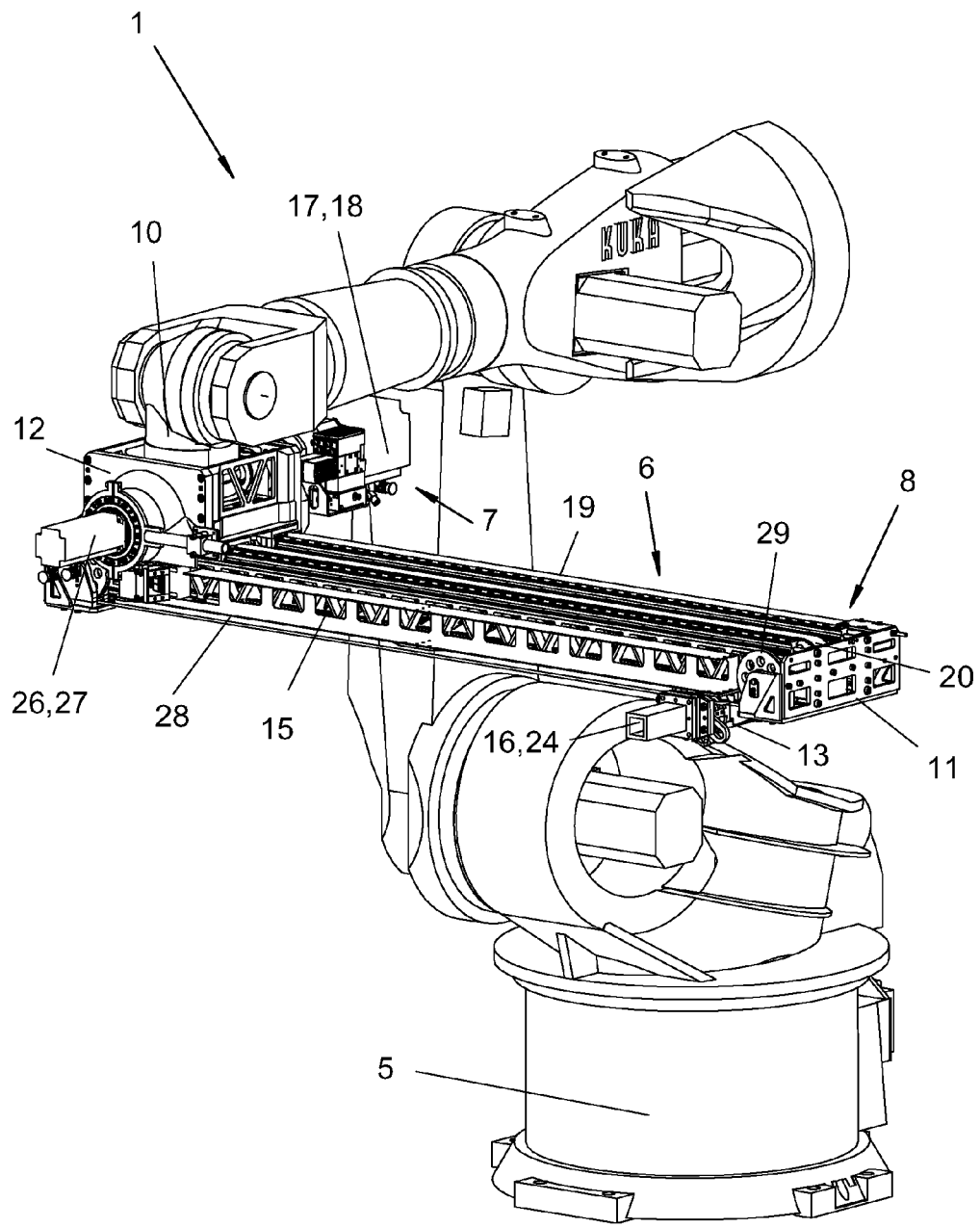
FIG. 4 is a perspective view showing a third variant of the transport unit.
Figure 5:
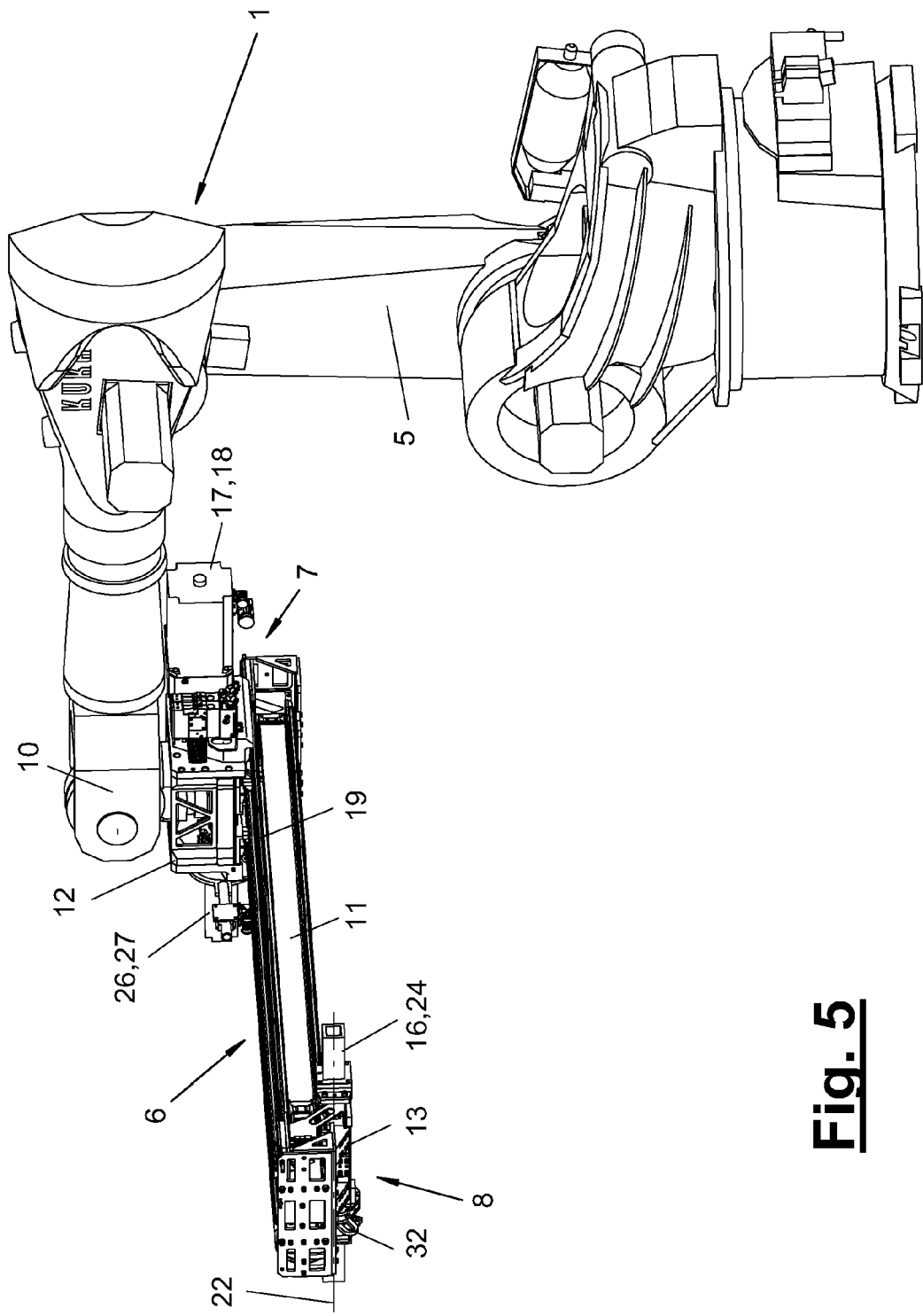
FIG. 5 is a perspective view showing a third variant of the transport unit.
Figure 6:
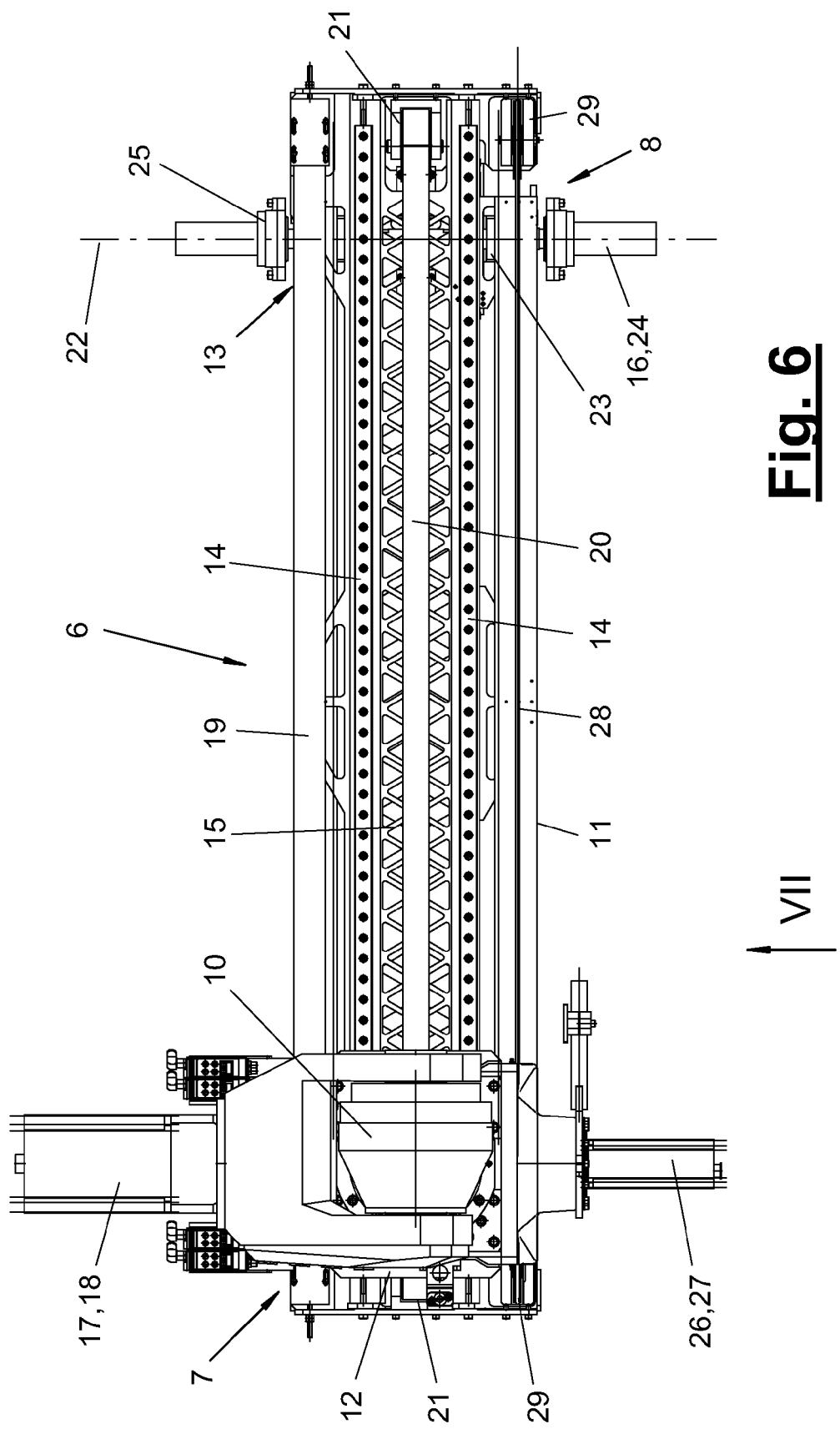
FIG. 6 is a top view of a transfer device of the third variant.
Figure 7:
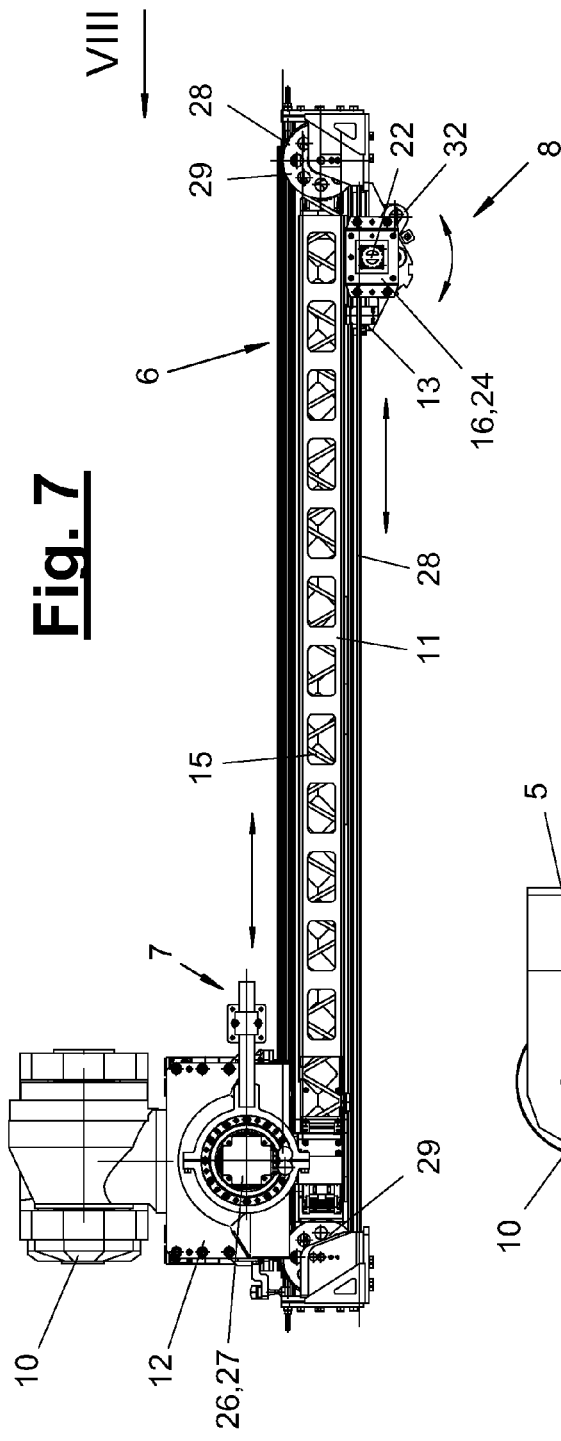
FIG. 7 is a folded view of the transfer device of FIG. 6.
Figure 8:
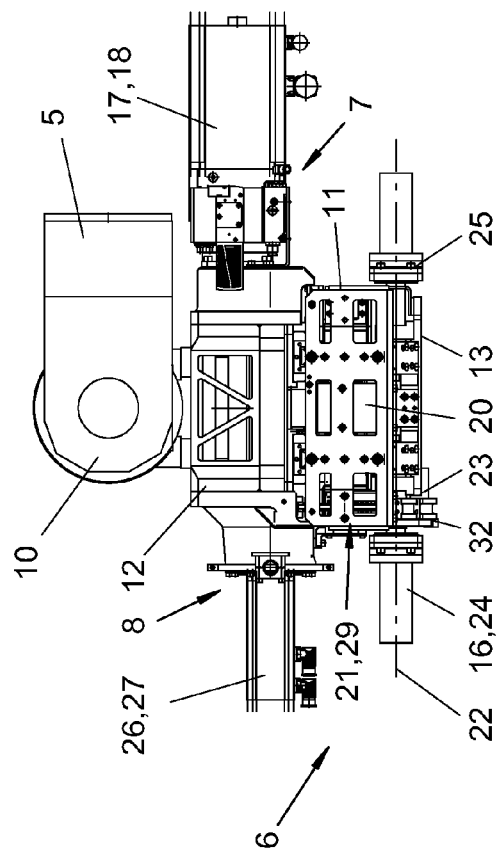
FIG. 8 is another folded view of the transfer device of FIG. 6.
Figure 9:
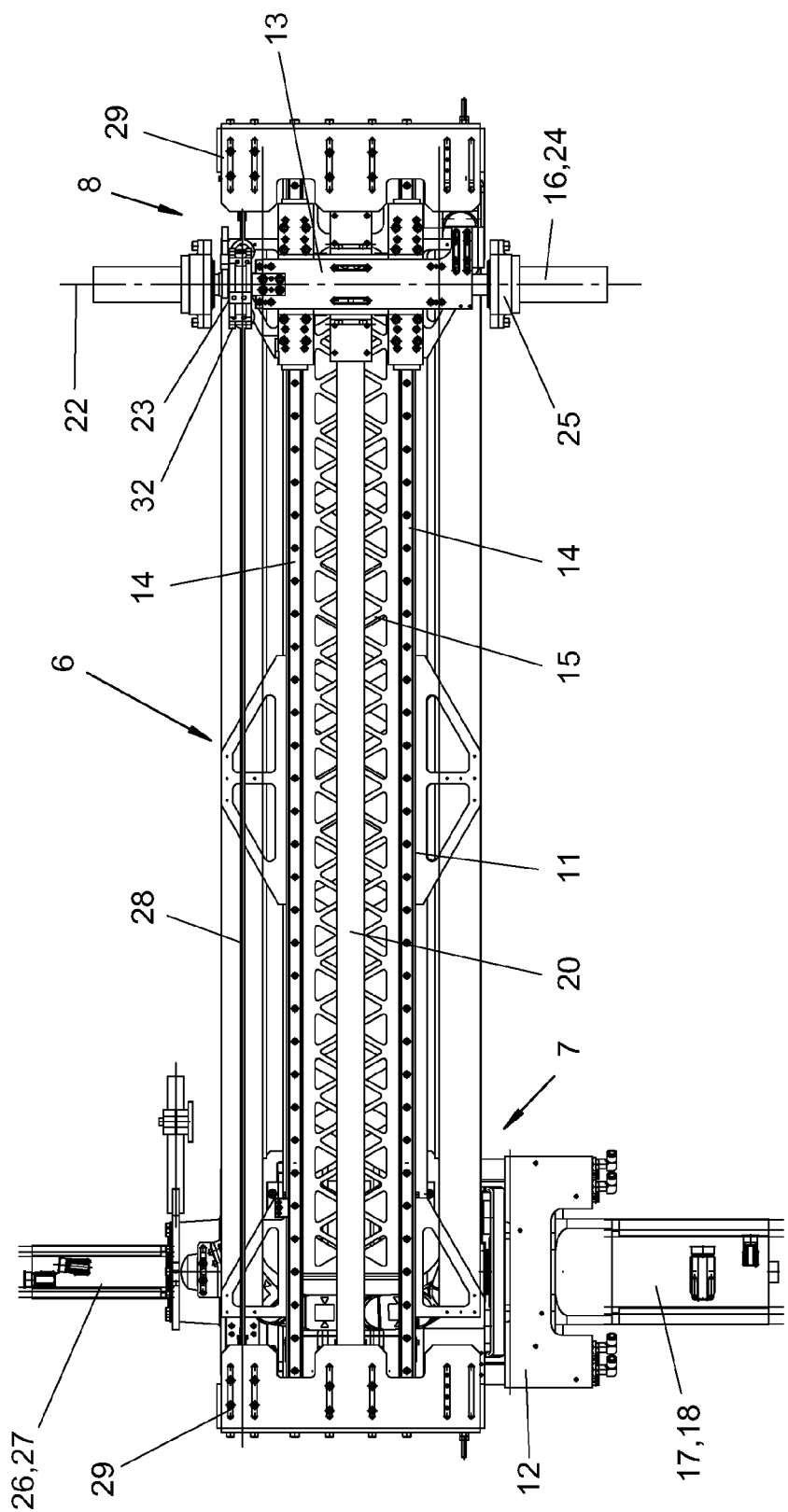
FIG. 9 is another folded view of the transfer device of FIG. 6.

The transfer means (6) is shown in FIGS. 2 and 3 in a first and second variant. FIGS. 4 through 10 show a third variant of the transfer means (6). It can be seen in detail in a top view in FIG. 6, whereby FIGS. 7 and 8 show the associated lateral and front views according to arrows VII and VII. FIG. 9 shows a bottom view.

In each of the different variants, the transfer means (6) has a workpiece holder (16) for the gripping tool (9), which can be moved translatorily and rotatorily by the feed means and pivot means (7, 8) in relation to the robot hand (10). FIG. 7 shows the movement possibilities with arrows. The gripping tool (9) may be designed in any suitable manner. In the exemplary embodiment shown of FIG. 1, it is a gripper spider with a support frame and with a plurality of gripping elements, which are designed, e.g., as suction heads, magnetic heads or the like, and which grip the workpiece (2) at predetermined points.

The gripping tool (9) may be single-component or multi-component. It may be connected to the workpiece holder (16) via a, e.g., peg-shaped or tubular tool connection (24) and a coupling (25) possibly arranged there. The coupling (25) can be operated manually. It may also have a drive and be remote controllable, such that an automatic tool change of the above-described type is possible.

In each of the different variants, the transfer means (6) may be moved back and forth by the robot (5) between the machining devices (3, 4). The transfer means (6) can also itself be moved in relation to the robot (5) and especially to its robot hand (10). With a short distance of the machining devices (3, 4) and with the transfer means (6) having a sufficiently long length, the robot (5) may optionally remain at rest or be limited to lifting movements and possibly complementary pivoting movements, whereby the main transport movement is performed along the connecting line (31) by the transfer means (6).

FIG. 1 illustrates such a configuration with the press contour indicated in a dotted line in the right half of the figure. When the distance between the machining devices (3, 4) is greater, the robot (5) may perform an additional transport movement, for example, an essentially horizontal pivoting movement in order to move and transport the transfer means (6) additionally along the connecting line (31). FIG. 1 illustrates a greater distance between presses in the right half of the figure with the solid lines.

The transfer means (6) has a support bar (11) connected to the robot hand (10). At the support bar (11), the gripping tool (9) or tool holder (16) can be moved along linearly or in another manner and also be pivoted in relation to the support bar (11). As FIGS. 1 and 7 illustrate, the support bar (11) is preferably held by the robot (5) during the operation, such that the feed movement along the connecting line (31) has an essentially horizontal direction. The pivot axis (22) of the pivoting movement of the tool holder (16) may be aligned transversely to the feed movement or transversely to the longitudinal axis of the transfer means (6) and run parallel to the adjacent main plane or tool guide plane of the support bar (11), especially parallel to the bottom side of same.

The pivot axis (22) may especially have an essentially horizontal position during the operation of the transport unit (1). The essentially horizontal position means in both cases that a predominant direction component is in the horizontal line, whereby the feed movement and the pivot axis (22) can be aligned exactly horizontally or correspondingly obliquely.

The support bar (11) may itself be movable in relation to the robot hand (10), whereby it can be moved especially along the connecting line (31). It may project as an extension arm on both sides, once to the left and once to the right of the robot hand (10).

The support bar (11) has a high flexural strength and may be designed as a hollow body for weight reasons. It has a correspondingly stiff support structure (15), which is designed, e.g., as latticework. As an alternative, the support structure (15) may be designed as a box-type housing with openings for reducing the weight. The support bar (11) has a box shape that is essentially rectangular in cross section and may have a straight longitudinal extension. In this case, the feed movements are linear and in a straight line. As an alternative, they may be curved, whereby the support bar (11) has a correspondingly different shape.

The feed means (7) has a carriage (12), which can be connected to the robot hand (10) and for this has a corresponding coupling point for connection to the driven flange of the robot hand (10) or to a change coupling. As an alternative, the carriage (12) may also be connected to the last housing section of the robot hand (10). Furthermore, the feed means (7) has at least a second carriage (13), which is provided, e.g., for the tool holder (16). Both carriages (12, 13) are arranged in a linearly movable manner at the support bar (11) and can be guided movably or displaceably or traveling via suitable guides (14), e.g., two-track rail guides in connection with roll cages or sliding blocks at the carriages (12, 13), with greater support basis securely against toppling over and linearly in the feed direction. The guide (14) for the carriage (13) forms the above-mentioned tool guide plane.

The carriages (12, 13) may be arranged on different sides of the support bar (11). In the exemplary embodiments shown, the carriage (12) for the robot hand (10) is located on the bar top side and the carriage (13) for the tool holder (16) is located on the carriage bottom side. Variations of this assignment are possible, as, e.g., the carriages (12, 13) and their guides (14) are arranged diagonally or opposite one another on the lateral support bar edges.

In the embodiments shown, the pivot axis (22) for the tool holder (16) and the gripping tool (9) may be in the area of the support bar (11) or in the area of the carriage (13). As an alternative, it may be at a distance from the support bar (11) with corresponding shape of the pivot means (8) and be, e.g., in the area of the workpiece (2).

The feed means (7) and pivot means (8) have controllable drives (17, 26). They may be designed in any suitable manner. A feed drive (17) may be formed, e.g., by an arrangement of cylinders, a linear motor or the like. A pivot drive (26) may be formed, for example, by a motor placed on the rotary axis of the tool holder (16).

In the exemplary embodiments shown, the feed drive (17) and pivot drive (26) are arranged at the robot hand (10) or at the associated carriage (12). This is favorable for weight distribution and for supplying operating materials. As a result, the drives (17, 26) may be arranged relatively fixed against the support bar (11) and the other carriage (13).

The feed means (7) is used for moving the carriages (12, 13) and possibly the support bar (11). These are, e.g., mutual relative movements of the carriages (12, 13) and relative movements of the support bar (11) against the robot (5) or its robot hand (10) and the carriage (12) connected there.

The carriages (12, 13) can be moved and driven independently of one another. The carriages (12, 13) may, however, also be connected to one another by means of a circumferential coupling means (20), such that they perform movements dependent on one another.

The coupling means (20) is formed, e.g., by a flexible connecting element, for example, a belt or a cable, which is connected to both carriages (12, 13) and carries these along with its movement. The coupling means, which is arranged, e.g., at the support bar (11), is guided in a closed loop via deflections (21) at both front ends of the support bar (11). The feed drive (17) acts on the support bar (11) and moves same linearly against the carriage (12) held at the robot (5). This relative movement is transmitted via coupling means (20) to the other carriage (13), which is consequently moved in the same direction as the support bar (11) and has twice the absolute speed of the support bar (11). The coupled carriages (12, 13) move at the support bar (11) in opposite directions.

In the embodiment shown the feed drive (17) has a motor (18) and a transmission means (19) acting on the support bar (11). The motor (18) may be a controllable electric motor, especially an electric servomotor, which is connected to the robot control system and makes the exact and fast positioning movements possible. The motor (18) may have a downstream reduction gear.

In the first embodiment of FIG. 2, the transmission means (19) is designed as a rack-and-pinion drive, whereby motor (18) drives a pinion directly or via an upstream gear, which pinion meshes with a rack aligned along the support bar (11) and arranged on the top side of same. The second variant of FIG. 3 may also have such a rack-and-pinion drive or a different drive, which converts the motor rotation into a translatory movement of the support bar (11).

In the third embodiment of FIGS. 4 through 10, the transmission means (19) is designed as a belt drive, whereby a pinion associated with the motor (18) meshes with a toothed belt in an omega loop that is finite and fixed with both ends at the front areas of the support bar (11). The belt drive (19) is arranged, e.g., on the top side and at a longitudinal edge of the support bar (11).

There are likewise various embodiments for the pivot drive (26). It is used to influence the rotary or pivoting position of the tool holder (16) at its carriage (13), whereby this is uniformly possible in all carriage positions.

The pivot drive (26) may likewise have a controllable motor (27). As in the feed drive (17), this may be an electric motor, especially an electric servomotor, which is likewise connected to the robot control system and makes possible a fast and exact workpiece rotation and a positioning and holding of the rotary position as well. The holding forces can be applied by the motors (18, 27) in the feed drive and pivot drive (17, 26). In another motor arrangement, brakes may possibly be associated for support.

The pivot drive (26) is connected to the tool holder (16) by means of a transmission means (28). This may be a flexible transmission means, e.g., a cable or a smooth or toothed belt or the like that is arranged circumferentially at the support bar (11). It may be guided in a loop via deflections (29) on the front side at both front ends of the support bar (11). In the exemplary embodiments, various embodiments are shown to this end.

In the variants of FIGS. 2 and 3, the transmission means (28) is designed as a belt drive, especially as a toothed belt drive. A toothed belt is guided in an infinite loop via the deflections (29) on the front side and runs in the longitudinal direction of the support bar (11). A rotary body (23) designed as a pinion and connected to the pivot drive (26) meshes with an omega guide or otherwise with the toothed belt. In addition, the toothed belt is guided at the carriage (13) via another rotary body (23) with a loop and drives same. The driving rotation on the toothed belt is converted into a corresponding rotation of the tool holder (16). In this embodiment, the rotary axis (22) of the tool holder (16) and the rotary axis of the pinion or rotary body (23) coincide.

In the third variant of FIGS. 4 through 10, the transmission means (28) is designed as a cable drive. This cable drive (28) requires less overall height than the toothed belt drive of the first two embodiments. An infinite or finite cable is also guided here via two rotary bodies (23) and is here connected nonrotatably to the rotary bodies (23) at, at least one point for synchronization. The cable may wind around the rotary body (23) and is fixed at the rotary body jacket with a clamp or the like. As a result of this, a rotary movement of the rotary body (23) on the driving side is converted into a corresponding rotary movement on the driven side at the carriage (13).

In this embodiment as well, the rotary axis (22) of the tool holder (16) may coincide with the rotary axis of the rotary body (23) at the carriage (13). As an alternative, the axes may be spaced apart from one another, whereby the rotary body (23) on the carriage side acts on the tool holder (16) via a transfer (32). The transfer (32) may be formed, e.g., by a cam disk with a sliding block, as they are shown, for example, in FIGS. 7 and 8.

In a further variant (not shown) the pivot means (8) may have a rotary axis (22) located at a distance and, e.g., in the workpiece (2). In this case, e.g., the transmission means (28) may be designed as a toothed belt drive, which drives a pinion-like rotary body (23), which in turn meshes with a toothed segment, which is bent about the rotary axis (22), whereby the tool holder (16) is connected to this toothed segment. The toothed segment may be mounted in corresponding guides at the carriage (13) in a rotary movable manner.

Due to the circumferential arrangement of transmission means (28), a drive meshing of the pivot drive (26) is possible in all carriage positions. A feed movement of the support bar (11) by means of the feed drive (7) leads to a corresponding, equidirectional feed or travel movement of the carriage (13), such that the strand lengths between the rotary bodies (23) on the left and right sides of the support bar (11) are balanced and the feed movement has no effect on the pivot drive (26).

FIGS. 11 and 12 show various movement positions of the transfer means (6). In FIG. 11, the carriage (12) of the feed means (7) is located at the right end of the support bar (11), whereby the other carriage (13) with the gripping tool (9) is located at the other left end of the support bar. The carriage (13) can move along the support bar (11) coupling with or independently of the carriage (12) and can assume any positions, e.g., the other end position at the right end of the support bar shown in dotted line. Any intermediate positions or travel movements are possible between them. The pivot means (8) may be at rest or be activated during the movements of the carriages (12, 13).

FIG. 12 shows a movement of the support bar (11) and of the carriage (12) in relation to the robot (5). Here, e.g., the bar (11) is fed or driven starting from the initial position of FIG. 11 to the right, such that the carriage (12) and the robot hand (10) are located at the left end of the support bar or may assume any intermediate position. An independently driven carriage (13) may be at rest during the movement of the support bar and may assume the initial position according to FIG. 11 shown in dotted line in FIG. 12. The carriage movements may also be superimposed on one another, such that the carriage (13) is moved from one to the other end of the support bar during the movement of the support bar or assumes any intermediate positions at the support bar (11). The comparison of FIGS. 11 and 12 illustrates the overall path of the gripping toll (9) that can be achieved via the flexible kinematics of the transfer means (6).

In addition, the transfer means (6) may be moved randomly in space by the robot hand (10). It can especially be rotated about the last driven axle or hand axle of the robot or of the robot hand (10).

There are various possibilities for the arrangement of the feed and pivot drives (17, 26) at the carriage (12). In the first and second variants of FIGS. 2 and 3, both drives (17, 26) are arranged behind one another and on both sides at the carriage (12) as viewed in the longitudinal direction of the support bar (11). Their rotary axes are aligned transversely to the longitudinal axis of the bar and in parallel. In the third variant, the drive arrangement is rotated. Here, the feed drive (17) and pivot drive (26) are arranged opposite one another and on both sides at the carriage (12) as viewed in the transverse direction of the support bar (11). Their drive axes are in turn aligned transversely to the longitudinal axis of the bar and are also directed against one another. They may possibly also be aligned. In all variants shown, the drives (17, 26) and their motors (18, 27) may be located at approximately the same height and are arranged above the support bar (11). As an alternative, other arrangements are also possible.

The gripping tool (9) can be supplied with operating materials, for example, current, vacuum or the like by the robot (5) and via the robot hand (10). E.g., an energy chain (30) shown in the top view in FIG. 10 may be present here, which is provided at one end with a feed point at the carriage (12) and which at the other end is connected to the pivotable tool holder (16) and is connected there possibly with a media coupling. The latter may be necessary when a change coupling is arranged at the tool holder (16) for an automatic tool change. The feed point at the carriage (12) may likewise have a media coupling or be connected to a change coupling. A media connection with a media supply can be made by the robot (5) here.

Figure 10:
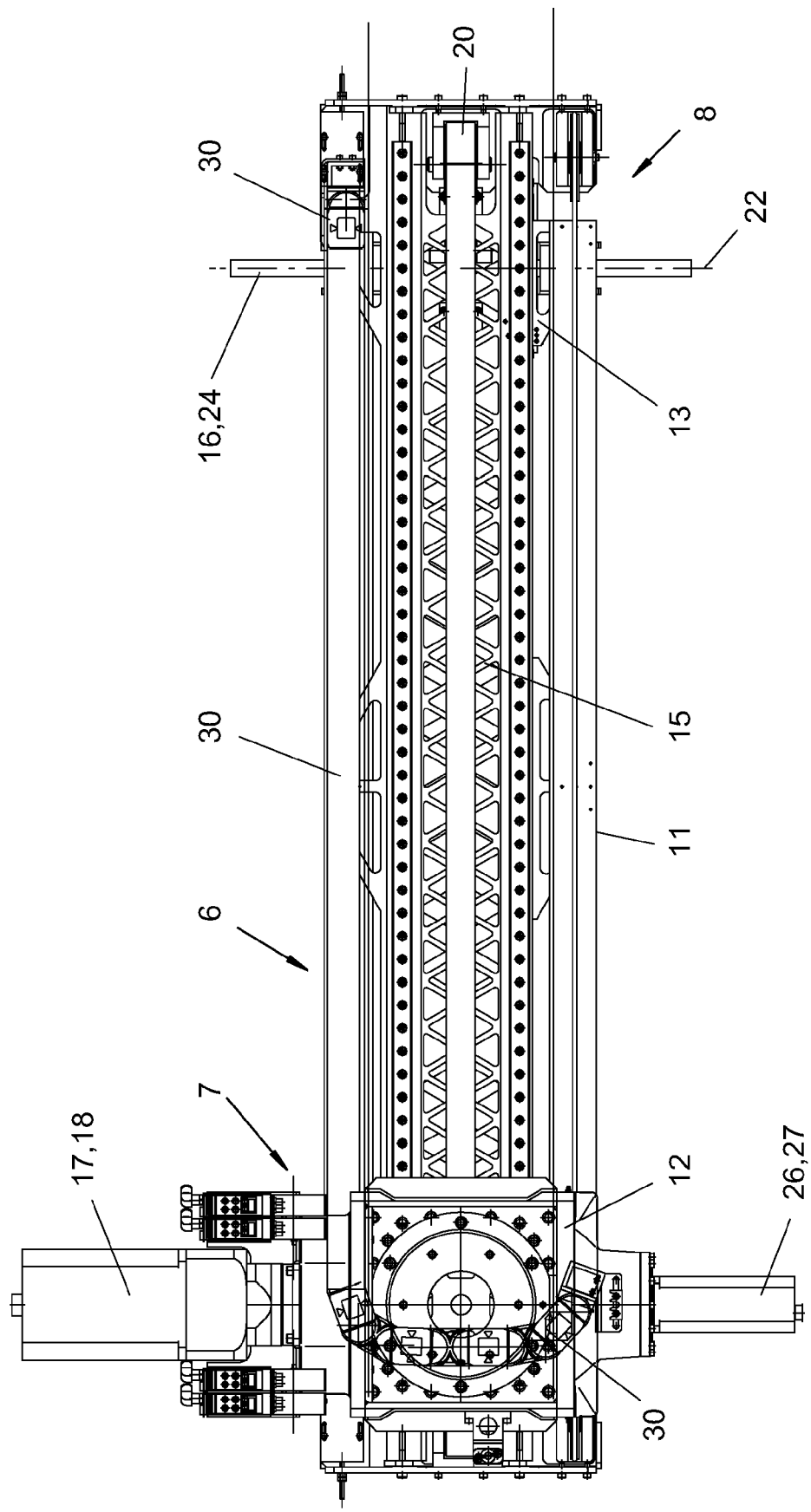
FIG. 10 is a schematic view of an energy chain in the transfer means of FIG. 6.

As FIG. 10 illustrates, the flexible energy chain (3) may consist of a plurality of chain links, in the hollow interior of which one or more flexible supply lines are guided. The energy chain (30) may extend within the support bar (11) and thereby at its longitudinal edges. The chain deflection over the width of the support bar is performed at the carriage (12). FIG. 10 shows the end position in the bottom view of the support bar (11) with a straight chain section arranged at the upper edge of the bar, which straight chain section is accommodated in a corresponding mount at the support bar (11). When the support bar (11) moves opposite the carriage (12) to the left, the straight chain section is unwound at the upper edge of the support bar and forms a new straight chain section in a mount there at the bottom edge of the support bar. The above-mentioned upper and lower edge of the bar refers to the view of FIG. 10.

Figure 13:
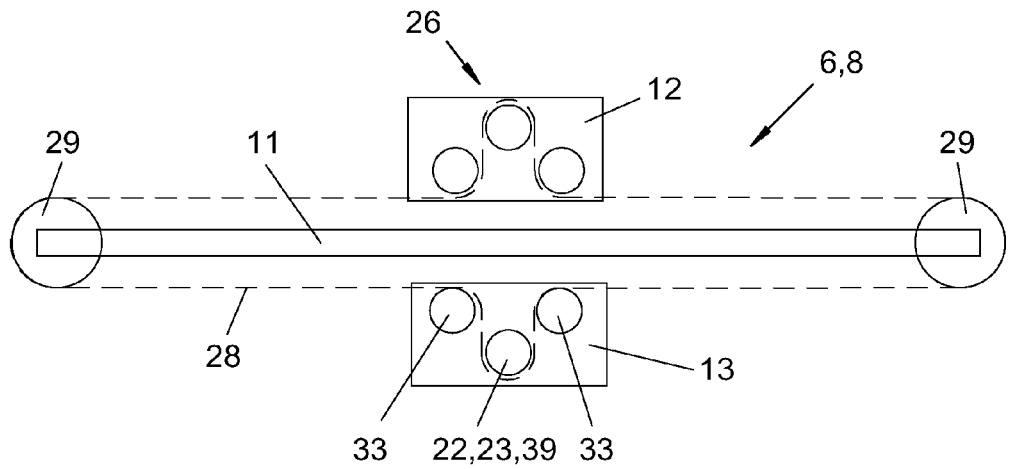
FIG. 13 is a schematic view of a variant of a pivot drive.
Figure 14:
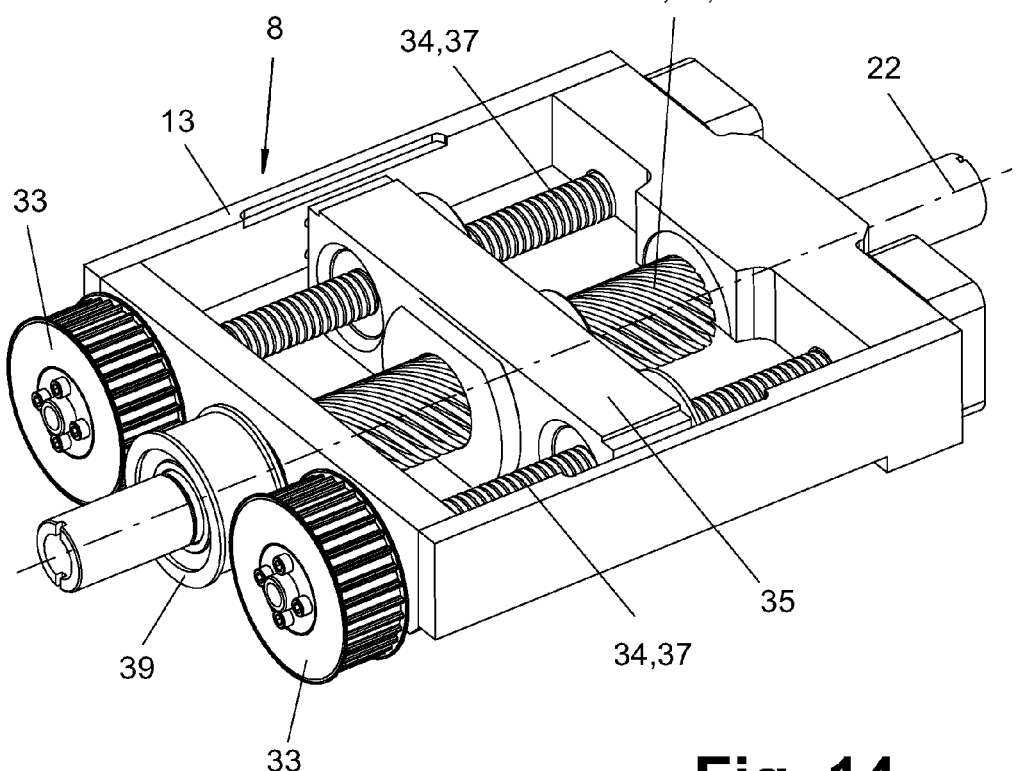
FIG. 14 is a perspective view of a gear of the pivot drive of FIG. 13.

FIGS. 13 through 15 show a variant of the pivot means (8). The pivot drive (26), arranged at a suitable point, e.g., at the carriage (12), drives a transmission means (28) circumferentially, which, is designed, e.g., as a toothed belt and is guided via end deflections (29) at the support bar (11) in the above-described manner. At the lower carriage (13) with the pivot axis (22), the transmission means (28) is guided in an omega guide with a loop via two driving wheels (33), and especially a pinion, and a deflection roller (39) arranged between them for deflection. The transmission means (28), e.g., the toothed belt, is connected to driving wheels or pinions (33) in a rotationally engaged manner, e.g., via meshing with teeth and in case of a circular movement drives the shafts (34) connected to the driving wheels or pinions (33). The shafts (34) are arranged in parallel to the pivot axis (22) and to the rotary body (23) and mounted in suitable pivot bearings in the carriage (13). On the outside, the shafts (34) have a screw-type thread (37), especially a movement thread. In this exemplary embodiment, the rotary body (23) is designed as a shaft (36) and is also rotatably mounted in the carriage (13) with a suitable bearing. The deflection roller (39) is itself mounted freely rotatably on the shaft (36). On the outside, the shaft (36) has a thread (38), and especially a movement thread. The shafts (34, 36) form spindles.

All three parallel shafts (34, 36) with their outside threads mesh with a common, transversely mounted yoke (35), which is likewise arranged in the frame of the carriage (13) and is possibly guided in a sliding manner in the frame with a longitudinal guide. The yoke (35) has spindle nuts, e.g., in the form of passage holes for the three shafts (34, 36) with internal threads, which mesh with the shaft threads (37, 38).

The circular movement of the transmission means (28) is converted into a rotary movement of the pinions (33) and their shafts (34), which in turn leads to an axial movement of the meshing yoke (35) corresponding to the direction of rotation of the shafts. This axial movement of the yoke (35) is converted via the thread meshing at the thread (38) into a rotary movement of the shaft (36) of the rotary body (23). The spindles (34) drive the spindles (36) in a rotating manner. The transfer acting here is selectable. The thread (38) of the rotary body (23) or of the spindle (36) has, e.g., a greater pitch than the thread (37) of the spindles (34).

The variant of the pivot means (8) shown has various advantages. The surface pressure, which is only exerted on a very small surface in case of gears, can be distributed by means of the shafts or spindles (34, 36) to a considerably larger surface. Consequently, the material used may be stressed less and protected. Due to the different pitches of the shafts or spindles (34, 36), a very high transfer ratio can be formed. Due to the conversion ratio, a very high torque can be exerted onto the driving shaft or spindle (36), on the one hand, whereby, on the other hand, effects, such as vibrations or the like, can be reduced by means of an automatic locking of the shafts or spindles (34, 36) until the interaction of the spindle nuts in the yoke (35). In addition, due to a high transfer ratio, the rotary movement of the pivot body (23) and of the gripping tool (9) can be controlled very accurately.

In the exemplary embodiment shown of FIGS. 13 through 15, as in the above-described exemplary embodiments, the carriages (12, 13) are coupled to one another by means of a coupling means (20) (not shown). Consequently, a feed or travel movement of the carriages (12, 13) and a shifting movement of the support bar (11) does not affect the rotary position of the driving rotary or pivot bodies (23) and of the tool holder (16).

In the embodiments shown, the workpieces (2) are transported without intermediate depositing. In another embodiment (not shown), if necessary, a second robot may be arranged in the working area of the robot (5), which has its own gripping tool and possibly also a transfer means (6). In such a multiple robot arrangement, a workpiece transfer is possible, whereby the second robot can insert or feed the workpiece (2) in rotated position with other machining devices (3, 4). If the second robot is not needed, it can be removed via a travel axis or be made small by means of axial movements, such that it does not disturb the robot (5).

Variations of the embodiments shown and described are possibly in various ways. The features of the different exemplary embodiments may be interchanged or combined with one another.

Pivot means (8) according to FIGS. 13 through 15 with the conversion and mutual transmission of spindle rotations via a meshing and axially moved yoke (35) has independent inventive relevance and may be used for any other purpose and for other devices, e.g., purely pivoting devices. In variation of the exemplary embodiment shown, the number and arrangement of the driving wheels or pinions (33) and their spindles (34) may vary. A single driving wheel (33) besides spindle (34) may be sufficient. The number may also be three or more.

The transfer means (6) may have a different design and may be multisection, whereby the support bar (11) may be designed, e.g., as a multisection telescopic carriage. When using a robot (5), this is, however, not necessary, because the length of the support bar (11) may only be aligned according to the depth of immersion at the machining device (3, 4) and can be designed as correspondingly short. The length of the support bar (11) may especially be shorter than the distance between the machining devices (3, 4), and especially between their inner end positions for the position of the gripping tool (9) or tool holder (16). The lacking bar length may be compensated by a transport movement of the robot (5) in the direction of the connecting line (31).

Furthermore, the components of the transfer means (6), and especially the design of the support bar (11), of the feed drive (7) and of the pivot drive (8) may vary. The number of carriages (12, 13) may be greater than two, whereby the associated drives are correspondingly modified. In addition, the transfer means (6) may have its own control system for its components and especially its drives (17, 26).

In the manner indicated in the introduction, the feed means (7) may have independent drives for the two or more carriages (12, 13) uncoupled from one another. Consequently, the carriages (12, 13) can be moved independently of one another. A carriage (13) for the tool or gripping tool (9) may have, e.g., an independent travel drive, which is arranged stationarily at the support bar (11) or as a variation is arranged at and moved with the carriage (13). In case of a movement of the carriages independent of one another, the pivot means (8) can be correspondingly adapted. A corresponding pivot drive can be arranged for this, e.g., at a carriage (13). In further variation, the pivot drive (26) shown in the exemplary embodiments can be used with the transmission means (28), whereby the pivot drive (26) performs compensation movements in order to uncouple the pivoting movement of the rotary body (23) from the travel movement of the carriage or carriages (12, 13).

Variations are also possible regarding the design of the robot or other manipulator (5). In addition, the transport unit (1) shown may be used for transport purposes other than for the described transport of sheet metal between presses (3, 4). The transport also does not have to take place in a random manner between adjacent machining devices (3, 4), but rather can take place between workpiece deposit sites or the like.

While specific embodiments of the invention have been shown and described in detail to illustrate the application of the principles of the invention, it will be understood that the invention may be embodied otherwise without departing from such principles.

The invention claimed is:

1. A transport unit for transporting workpieces between adjacent deposit sites or machining devices, the transport unit comprising:
    a multiaxle robot;
    a gripping tool; and
    a controllable transfer device, guided by the robot, with a gripping tool feed and a gripping tool pivot for feeding and pivoting the gripping tool relative to the multiaxle robot, wherein:
    the robot is designed as an articulated arm robot and has a multiaxle robot hand connected to said gripping tool feed;
    the transfer device has a tool holder, which can be moved in a translatory and rotary manner by the gripping tool feed and the gripping tool pivot in relation to the robot hand;
    the transfer device has a support bar connected to the robot hand, at which the tool holder is arranged in a displaceable, especially linearly movable, and pivotable manner in relation to the support bar;
    the gripping tool feed has a carriage for connection to the robot hand and a carriage for the tool holder, which are arranged and guided in a longitudinally movable manner at the support bar;
    the tool holder is mounted rotatably at the associated carriage about a pivot axis and is connected to the pivot drive by means of a circumferential transmission means;
    the carriages are connected by means of a circumferential coupling means for transmitting motion; and
    the circumferential coupling means and the transmission means are guided in a finite or infinite loop via deflections at both ends of the support bar.

2. A transport unit in accordance with claim 1, wherein the gripping tool feed and gripping tool pivot are connected to the robot control system and are designed or controlled as additional axes of the robot.

3. A transport unit in accordance with claim 1, wherein the articulated arm robot has six or more basic axes.

4. A transport unit in accordance with claim 1, wherein the transfer device is arranged at the robot hand.

5. A transport unit in accordance with claim 1, wherein the support bar is held in a movable, displaceable, manner in relation to the robot hand.

6. A transport unit in accordance with claim 1, wherein the carriages are mounted movably in rail guides on different sides of the support bar.

7. A transport unit in accordance with claim 1, wherein the feed drive and pivot drive are arranged at the robot hand or at the associated carriage.

8. A transport unit in accordance with claim 1, wherein the carriages are connected by means of a circumferential coupling means for transmitting motion.

9. A transport unit in accordance with claim 1, wherein a gripping tool pivot has a driven transmission means and a driving wheel connected thereto in a rotationally engaged manner with a spindle, wherein the spindle is connected via a meshing, axially movable yoke with spindle nuts to a spindle-like rotary body and drives same in a rotating manner.

10. A transport unit in accordance with claim 1, wherein the tool holder has a tool connection and a coupling for the gripping tool, which can be actuated manually or driven in a remote controllable manner.

11. A transport unit in accordance with claim 1, wherein the tool holder has a pivot axis, which is aligned transversely to it's a tool holder feed direction and parallel to the adjacent main plane or tool guide plane of a support bar.

12. A transport unit in accordance with claim 11, wherein the support bar is held by the robot such that the feed motion is directed along the connecting line between the machining devices and essentially horizontally, wherein the pivot axis of the pivot motion is aligned transversely to the feed motion and essentially horizontally.

13. A transport unit in accordance with claim 11, wherein the pivot axis lies in the area of the carriage or lies at a distance in the area of the workpiece.

14. A transport unit in accordance with claim 1, wherein the gripping tool feed and gripping tool pivot have controllable drives.

15. A transport unit in accordance with claim 14, wherein the controllable drives have electric servomotors.

16. A transport unit in accordance with claim 14, wherein the feed drive and pivot drive are arranged behind one another and on both sides of the carriage for connection to the robot hand as viewed in the longitudinal direction of the support bar.

17. A transport unit in accordance with claim 14, wherein the feed drive and pivot drive are arranged opposite one another and on both sides of the carriage for connection to the robot hand as viewed in the transverse direction of the support bar.

18. A transport unit in accordance with claim 14, wherein the feed drive is connected to the support bar by means of a transmission means comprising a rack-and-pinion drive or belt drive.

19. A transport unit in accordance with claim 1, wherein the transmission means comprises a cable and is in drive connection with rotary bodies at the pivot drive and at the carriage.

20. A transport unit in accordance with claim 19, wherein the tool holder is connected to the rotary body at the carriage directly or via a transfer with a cam disk and sliding block.

21. A transport unit for transporting workpieces between adjacent deposit sites or machining devices, the transport unit comprising:
    a multiaxle robot;
    a gripping tool; and
    a controllable transfer device, guided by the robot, with a gripping tool feed and a gripping tool pivot for feeding and pivoting the gripping tool relative to the multiaxle robot, wherein:
    the robot is designed as an articulated arm robot and has a multiaxle robot hand connected to said gripping tool feed;

the transfer device has a tool holder, which can be moved in a translatory and rotatory manner by the gripping tool feed and the gripping tool pivot in relation to the robot hand;

the transfer device has a support bar connected to the robot hand, at which the tool holder is arranged in a displaceable at least one of linearly movably and pivotablly, in relation to the support bar; and the support bar has a support structure in the form of latticework.

22. A transport unit for transporting workpieces between adjacent deposit sites or machining devices, the transport unit comprising:

a multiaxle robot;

a gripping tool; and a controllable transfer device, guided by the robot, with a gripping tool feed and a gripping tool pivot for feeding and pivoting the gripping tool relative to the multiaxle robot, wherein:

the robot is designed as an articulated arm robot and has a multiaxle robot hand connected to said gripping tool feed;

the transfer device has a tool holder, which can be moved in a translatory and rotatory manner by the gripping tool feed and the gripping tool pivot in relation to the robot hand;

the transfer device has a support bar connected to the robot hand, at which the tool holder is arranged in a displaceable at least one of linearly movably and pivotablly, in relation to the support bar; and, the support bar has a support structure and the support bar has an energy chain integrated in the support structure.

* * * * *